(12) United States Patent
Dubus et al.

(10) Patent No.: US 10,727,748 B2
(45) Date of Patent: Jul. 28, 2020

(54) HIGH FREQUENCY DC VOLTAGE CONVERTER OF THE QUASI-RESONANT BUCK TYPE

(71) Applicant: 3D PLUS, Buc (FR)

(72) Inventors: Patrick Dubus, Saint-Forget (FR); Nicolas Perrot, Guyancourt (FR)

(73) Assignee: 3D PLUS, Buc (FR)

( * ) Notice: Subject to any disclaimer, the term of this patent is extended or adjusted under 35 U.S.C. 154(b) by 0 days.

(21) Appl. No.: 16/469,622

(22) PCT Filed: Dec. 15, 2017

(86) PCT No.: PCT/EP2017/083094
§ 371 (c)(1),
(2) Date: Jun. 13, 2019

(87) PCT Pub. No.: WO2018/109185
PCT Pub. Date: Jun. 21, 2018

(65) Prior Publication Data
US 2019/0356228 A1    Nov. 21, 2019

(30) Foreign Application Priority Data

Dec. 15, 2016    (FR) ..................... 16 62501

(51) Int. Cl.
*H02M 3/158* (2006.01)
*H02M 1/00* (2006.01)
(52) U.S. Cl.
CPC ....... *H02M 3/1582* (2013.01); *H02M 1/0061* (2013.01); *H02M 2001/0025* (2013.01); *H02M 2001/0058* (2013.01)

(58) Field of Classification Search
None
See application file for complete search history.

(56) References Cited

U.S. PATENT DOCUMENTS

| 8,288,953 B1 * | 10/2012 | Mei | ..................... | H05B 33/0851 |
| | | | | 315/209 R |
| 2004/0264214 A1 * | 12/2004 | Xu | ........................ | H02M 3/158 |
| | | | | 363/16 |

(Continued)

OTHER PUBLICATIONS

Liu, et al., "Zero-voltage switching technique in DC/DC converters", IEEE Transactions on Power Electronics, vol. 5, Issue: 3, pp. 293-304, Jul. 1990.

*Primary Examiner* — Jeffrey A Gblende
(74) *Attorney, Agent, or Firm* — Baker & Hostetler LLP (57) ABSTRACT

A DC voltage converter of the quasi-resonant Buck type includes an input port having a first terminal designed to receive a voltage level to be converted, an output port having a first terminal designed to supply a converted voltage level, a first switch connected in series to the first terminal of the input port and a regulation circuit configured for: generating a ripple voltage, rising or falling depending on a closed or open state of the first switch; generating a setpoint signal proportional to a difference between an average level of converted voltage and a reference voltage; performing a first comparison between the setpoint signal and the converted voltage level to which the ripple voltage has been added; and depending on the result of the first comparison, generating or not an activation signal on its output controlling the closing of the first switch for a predefined period.

11 Claims, 3 Drawing Sheets

(56) References Cited

U.S. PATENT DOCUMENTS

| | | |
|---|---|---|
| 2005/0135036 A1 | 6/2005 | Kanamori et al. |
| 2013/0002223 A1 | 1/2013 | Xi |
| 2014/0049239 A1 | 2/2014 | Labbe |
| 2015/0326123 A1* | 11/2015 | Fukushima ............ H02M 3/158 323/271 |

\* cited by examiner

HIGH FREQUENCY DC VOLTAGE CONVERTER OF THE QUASI-RESONANT BUCK TYPE

CROSS-REFERENCE TO RELATED APPLICATIONS

This application is a National Stage of International patent application PCT/EP2017/083094, filed on Dec. 15, 2017, which claims priority to foreign French patent application No. FR 1662501, filed on Dec. 15, 2016, the disclosures of which are incorporated by reference in their entirety.

FIELD OF THE INVENTION

The field of the present invention is that of switch-mode power supplies. More particularly, the invention relates to a non-isolated DC/DC voltage converter of the quasi-resonant Buck type, notably for Point of Load—regulator applications. The conversion of DC voltage is used in numerous technological fields arising from the need to convert the power supply voltage of devices, such as the conversion of the voltage delivered by a battery of a portable computer to a processor, to applications operating within much more critical environments such as that of space applications.

BACKGROUND

Figure 1:
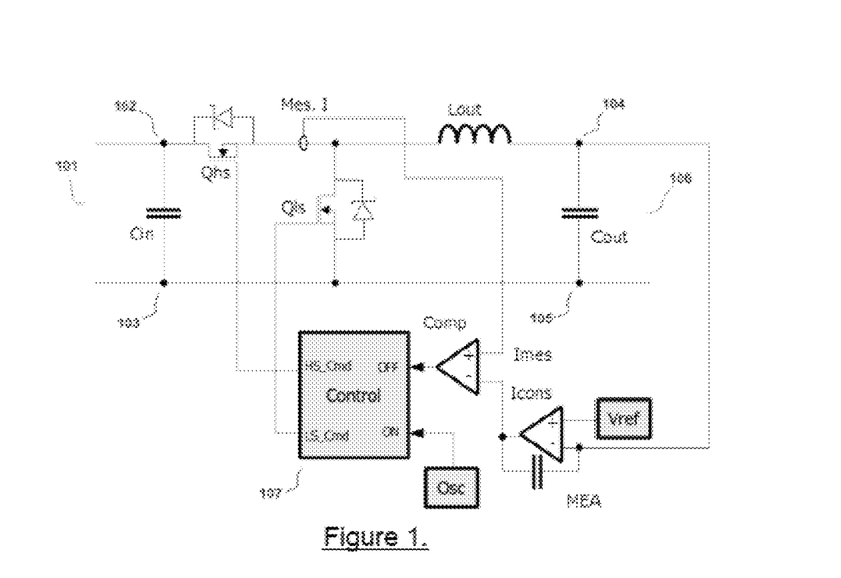
FIG. 1, already described, illustrates the electrical circuit diagram of a Buck voltage converter according to the prior art.

Generally speaking, the function of a DC/DC voltage converter at its output is either to increase a voltage present at its input, or to decrease it, in order to supply the device located downstream. FIG. 1 shows a Buck converter according to the prior art. This converter comprises two voltage-controlled switches Qhs and Qls of the MOSFET (for Metal Oxide Semiconductor Field Effect Transistor) type, a regulation circuit in current control mode which allows the output voltage level Vout of the converter to be regulated as a function of the signal Mes. I from the current flowing in the first switch Qhs. This regulation circuit comprises:
- a control circuit 107 which may take the form of a programmed or wired logic circuit, such as with flip-flops, and which allows the opening or the closing of the switches to be controlled;
- an error amplifier MEA which generates a setpoint signal Icons proportional to a difference between the output voltage level of the converter and a reference voltage;
- a comparator Comp allowing the signal from the current flowing in the first switch and the setpoint signal to be compared.

The converter also comprises, at the output, a low-pass filter formed by an output inductor Lout and by an output capacitor Cout. An oscillator Osc connected to the input of the control circuit allows the first switch to be controlled on the rising edge of its pulses. The Buck converter comprises two distinct regimes within its operational period. Each regime is characterized by the state of the first switch Qhs. A regime called "ON" is obtained for a closed state of the first switch Qhs, whereas a regime called "OFF" corresponds to an open state of the first switch.

The oscillator is connected to the input ON of the control circuit 107 and allows one operational period to be triggered, on the rising edges of its pulses, by generating the command to close the first switch HS_Cmd. This close command begins the "ON" regime of the converter. The oscillator may be implemented by means of an analogue circuit or of a resonator or of a quartz crystal and fixes the frequency of operation of the converter.

In a first phase ("ON" regime), the first switch Qhs is closed. The current increases rapidly until it reaches the value of that flowing in the output inductor, then it increases more slowly until it reaches its maximum value at the end of this first phase. The current in the output inductor increases and is equal to the current in Qhs. During the whole of this phase, the second switch Qls is open (the command to open has taken place just before closing the switch Qhs). The command to close Qhs and the command to open Qls take place with losses that increase with the frequency of operation of the converter.

In a second phase ("OFF" regime), the switch Qhs receives a command to open, then the switch Qls receives a command to close. The current in the output inductor is equal to the current in Qls and is falling. The command to open Qhs and, to a lesser extent, the command to close Qls takes place with losses and increases with the frequency of operation of the converter.

The regulation of the converted output voltage is linear and comprises two nested control loops. The first loop is external and formed with the error amplifier MEA which allows a setpoint signal Icons to be generated being an image of a current which is a function of (for example to) the difference between a reference voltage Vref, connected to its first input, and the converted voltage level connected to its second input. This first loop controls the average value of the converted voltage level. The second loop is internal and formed with the comparator Comp whose first input is presented to the setpoint signal Icons and whose second input is presented to the signal Imes, image of the current flowing in the first switch. This second loop allows a control on the maximum value of the current. The command to open Qhs occurs when the image signal of the current Mes. I reaches the value of the image signal Icons.

In this type of converter, the reactive elements are bulky.

One known solution aimed at reducing the size of the reactive elements, and as a consequence that of the converter, consists in increasing the switching frequency of the switches. Nevertheless, this increase of the switching frequency increases the switching losses and leads to problems of electromagnetic incompatibilities. The speed of the regulation of the voltage level is an important factor for this type of converter because it allows a constant voltage to be delivered to the load irrespective of the current demands that the latter imposes (high and abrupt demands for latest generation digital loads). With the principle of regulation implemented in the prior art, the speed of regulation is limited by the speed of the error amplifier and by the compliance to the margins of stability for a stable control of the output voltage. This stability may also be affected by the nature of the output load (choice of the user). In order to have a stable system, the maximum speed of regulation is fixed during the design phase and it cannot be improved by choices decided by the user (addition of an output capacitor, for example). This type of regulation leads to compromises being made which need to be compensated by the increase of the output capacitance and do not allow the size of the converter to be minimized.

SUMMARY OF THE INVENTION

The invention aims to obtain a high-speed regulation of the output voltage in order to miniaturize the reactive components without the need to oversize the latter and allow the user the possibility of further improving the dynamic performance characteristics via the addition of filtering solutions at the output.

According to the invention, the regulation of the output voltage level is carried out by a non-linear circuit thus having a high-speed dynamic behaviour. This type of regulation is particularly well suited to a converter having transistors with closed switching phases of constant duration COT (for "Constant On Time"). One element of this regulation is the addition of a ripple voltage on the output voltage level of the converter. This additional ripple voltage, rising or falling depending on the closed or open state of the first switch, guarantees a stable operation of the regulation irrespective of the presence of voltage noise or of the nature of the load. The transistors allowing a high frequency of operation may in particular be HEMTs (for High Electron Mobility Transistors) on a GaN (gallium nitride) substrate. Finally, the converter disposes of a circuit for protection against overloads which allows the next iteration for transfer of charges to be stopped when the current flowing in the transistor reaches a predetermined critical value.

One subject of the invention is a DC voltage converter of the quasi-resonant Buck type comprising an input port having a first terminal intended to receive a voltage level to be converted, an output port having a first terminal designed to supply a converted voltage level, a ground line connecting a second terminal of the said input port to a second terminal of the said output port, a first switch connected in series to the said first terminal of the input port and a regulation circuit having an input terminal connected to the said first terminal of the output port of the converter and an output terminal connected to a control terminal of the said first switch, the said regulation circuit being configured for:

generating a ripple voltage, rising or falling depending on a closed or open state of the said first switch;

generating a setpoint signal (Vcons) proportional to a difference between an average level of converted voltage and a reference voltage;

performing a first comparison between the said setpoint signal and the said converted voltage level to which the said ripple voltage has been added; and depending on the result of the said first comparison, generating or not an activation signal on its output controlling the closing of the said first switch for a predefined period.

According to particular embodiments of such a voltage converter

The said regulation circuit may furthermore comprise; a control circuit having an output designed to deliver the said activation signal; and a comparator circuit having an output designed to deliver the said result of the said comparison, the said output being connected to a first input of the said control circuit.

The said regulation circuit may furthermore comprise: an additional ripple circuit configured for delivering the said converted voltage level to which the said ripple voltage has been added, the additional ripple circuit having a first input connected to the said first terminal of the output port of the said converter, a second input connected to an output of the said control circuit, and an output connected to a first input of the said comparator circuit; and an error amplifier designed to deliver the said setpoint signal, the said amplifier having a first input connected to the said first terminal of the output port of the said converter, a second input configured for receiving the said reference voltage, and an output connected to a second input of the said comparator circuit.

The said control circuit may furthermore be configured for controlling; the closing or the opening of the said first switch; the generation, on the said second input of the said additional ripple circuit, of the said rising or falling voltage.

The said converter may furthermore comprise: a resonance inductor connected in series with the said first switch, having a first and a second terminal, the said first terminal being connected to the said first switch; a resonance capacitor, having a first and a second terminal, the said first terminal being connected to the second terminal of the resonance inductor; a second switch connected, on the one hand, to the said first terminal of the resonance capacitor and, on the other hand, to the said second terminal of the resonance capacitor.

The said converter may also comprise a low-pass output filter.

The said regulation circuit may comprise a circuit for protection against overloads comprising a circuit for measuring a current flowing in the said second switch; and a comparator circuit having: a first input for a predetermined limitation current signal; a second input connected to the said circuit for measuring the current flowing in the said second switch; the said circuit for protection against overloads having furthermore an output connected to a second input of the said control circuit; the said control circuit being configured for delivering, on its output, a signal depending on a comparison between the said first input and the said second input and controlling the opening of the said first switch for as long as the said signal representative of the current flowing in the said second switch is equal to at least the said predetermined limitation current signal. More particularly, the said current measurement circuit may comprise a resistor connected between the second terminal of the resonance capacitor and the said ground line.

The said converter may also comprise a flywheel diode connected in parallel to the said first switch, having a cathode connected to the first terminal of the first port, the said predefined period being chosen for opening the said first switch when the current flowing through the said first switch flows in the said flywheel diode.

The said control circuit may be configured for opening the said first switch for a predetermined minimum duration.

The said first switch and the said second switch may exhibit a switching time less than or equal to 100 ns and preferably less than or equal to 10 ns. More particularly, the said first switch and the said second switch may be fabricated using GaN technology.

Another subject of the invention is a method for conversion of a voltage by means of a DC voltage converter of the quasi-resonant Buck type, the voltage converter comprising an input port having a first terminal intended to receive a voltage level to be converted, an output port having a first terminal designed to supply a converted voltage level, a ground line connecting a second terminal of the said input port to a second terminal of the said output port, a first switch connected in series to the said first terminal of the input port and a regulation circuit having an input terminal connected to the said first terminal of the output port of the converter and an output terminal connected to a control terminal of the said first switch, the method comprising the steps for:

generation of a ripple voltage, rising or falling depending on a closed or open state of the said first switch;

generation of a setpoint signal proportional to a difference between an average level of converted voltage and a reference voltage;

comparison between the said setpoint signal and the said converted voltage level to which the said ripple voltage has been added; and, depending on the result of the said first comparison:

generation or not of an activation signal controlling the closing of the said first switch for a predefined period.

According to one embodiment of such a method, the said DC voltage converter of the quasi-resonant Buck type also comprises a resonance inductor connected in series with the said first switch, having a first and a second terminal, the said first terminal being connected to the said first switch; a resonance capacitor, having a first and a second terminal, the said first terminal being connected to the second terminal of the resonance inductor; a second switch connected, on the one hand, to the said first terminal of the resonance capacitor and, on the other hand, to the said second terminal of the resonance capacitor; the method furthermore comprising steps for: generation of a signal for closing the second switch when the voltage between the second terminal (MP) of the resonance inductor and the ground line becomes negative; and generation of a signal for opening the second switch in correspondence with the generation of the activation signal controlling the closing of the said first switch.

BRIEF DESCRIPTION OF THE DRAWINGS

The invention will be better understood and other features and advantages will become more clearly apparent upon reading the description that follows, presented by way of non-limiting example, and by virtue of the appended figures amongst which.

DETAILED DESCRIPTION

In the following description, the terms switch and transistor are used interchangeably. Similarly, the output voltage of the converter will sometimes be identified as being Vout, other times as being the converted voltage level.

Figure 2:
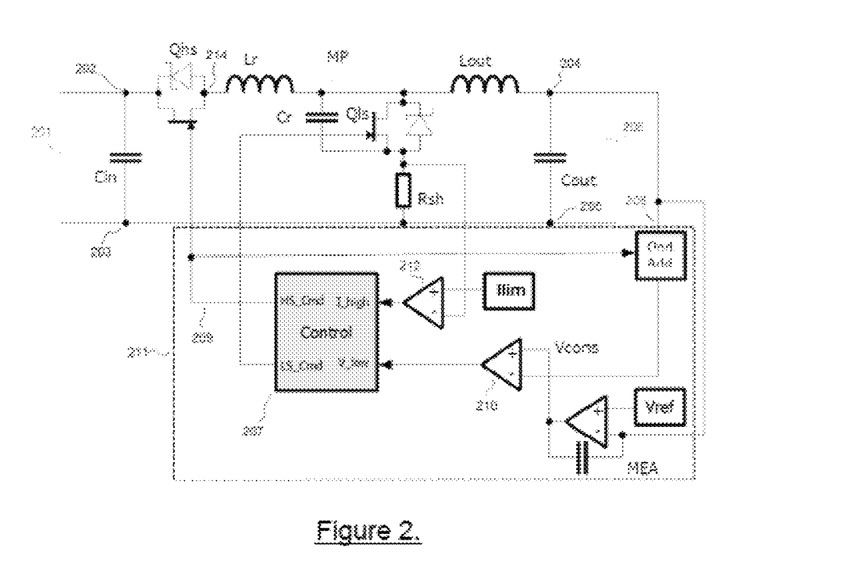
FIG. 2 illustrates the electrical circuit diagram of a quasi-resonant Buck converter according to one embodiment of the invention.

FIG. 2 illustrates a voltage Buck converter according to one embodiment of the invention. In this embodiment, only the "ON" phase of the converter has a constant duration which is pre-defined. The latter which corresponds to the duration of closing of the first switch Qhs is calculated so as to obtain a soft switching, in other words, upon closing, a switching that takes place at zero current owing to the presence of the resonance inductor Lr in series, upon opening, a switching that takes place when the current in the switch is negative and, consequently, flows in the diode situated in parallel. The converter has an input port 201 designed to receive a voltage level to be converted and an output port 206 allowing a converted voltage level to be supplied. The input port 201 comprises a first and a second terminal, respectively 202 and 203. The output port 206 also comprises a first and a second terminal, respectively 204 and 205. A ground line is connected between the second terminal 203 and the second terminal 205. Connected in parallel with the input port 201 of the converter, between the first terminal 202 and the second terminal 203, a capacitor Cin allows the filtering of the voltage level to be converted. A first switch Qhs formed by an HEMT is connected in series, on the one hand, to the first terminal 202 of the input port and, on the other hand, to the first terminal 214 of a resonance inductor Lr. According to one embodiment, the switch Qhs is connected in parallel with a flywheel diode whose cathode is connected to the terminal 202. According to one preferred embodiment, the HEMT uses GaN technology. The choice of GaN is justified by its robustness to various types of radiation, its low contact resistance and by its fast switching speed which, in a system with soft switching, does not create any drawbacks.

Figure 4:
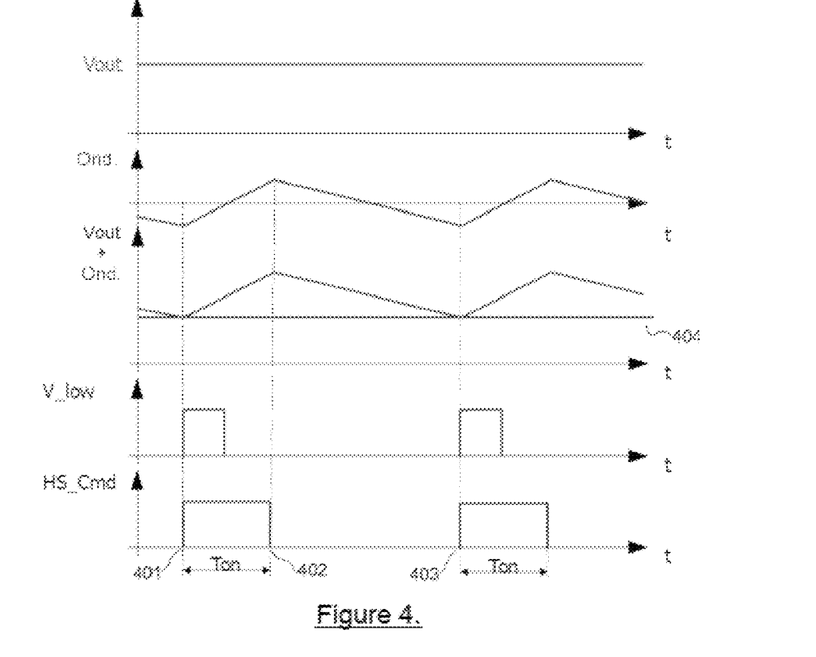
FIG. 4 illustrates timing diagrams of the principle of the regulation of the converted output voltage from the converter in FIG. 2.

Advantageously, the transistor allows a switching time from a few ns to a few tens of ns, preferably less than or equal to 100 ns, or even to 10 ns. The second terminal of the resonance inductor Lr is connected to the first terminal of a resonance capacitor Cr and to the measurement point MP. A second switch Qls is connected between the first and the second terminal of the resonance capacitor Cr (one alternative solution consists in connecting the second terminal of the capacitor Cr to ground). According to one preferred embodiment, a flywheel diode whose cathode is connected to the measurement point MP is connected in parallel with the switch Qls. The presence of this diode is not however indispensable. According to one embodiment, a resistor Rsh allows a measurement of the current flowing in the second switch Qls. The resistor is connected between the second terminal of the resonance capacitor Cr and the ground line. The low-pass output filter comprises an inductor Lout connected between the measurement point MP and the first terminal 204 and a capacitor Cout connected between the first terminal 204 and the second terminal 205. Connected to the output port of the converter, a regulation circuit 211 comprising an additional ripple circuit Ond. Add., an error amplifier MEA, a comparator 210, and a control circuit 207 allows:

a ripple voltage to be generated, rising for a closed state of the first switch Qhs and falling for an open state of the first switch Qhs;

a setpoint signal to be generated proportional to a difference between the average converted voltage level and a reference voltage Vref;

a first comparison to be made between the setpoint signal Vcons and the converted voltage level to which the ripple voltage has been added; and depending on the result of the first comparison, an activation signal to be generated or not on its output for controlling the closing of the said first switch for a predefined period TON shown in FIG. 4. More precisely, in the embodiment in FIG. 2, the activation signal controls the closing of the first switch for a converted voltage level to which the ripple voltage has been added, less than or equal to the setpoint voltage.

Figure 3:
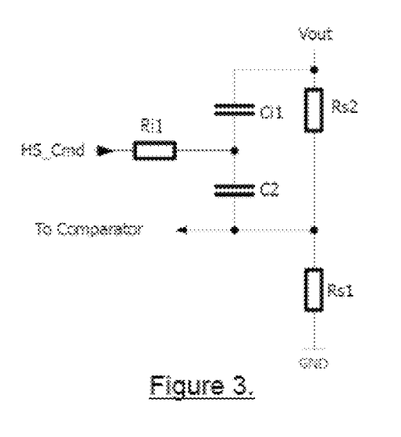
FIG. 3 illustrates one embodiment of the additional ripple circuit for the converter in FIG. 2.
Figure 5:
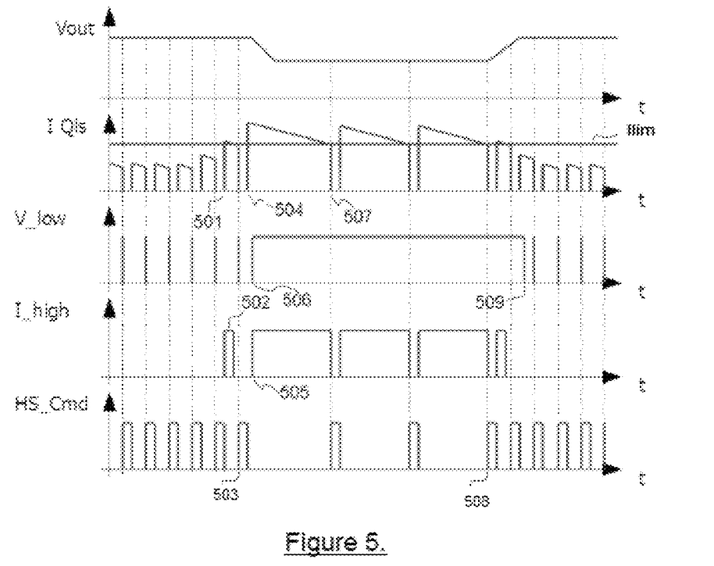
FIG. 5 illustrates timing diagrams of the principle of the protection against overloads for the converter in FIG. 2.

A first input of the additional ripple circuit Ond.Add. is connected to the first terminal 204 of the output port 206 of the converter, whereas the second input is connected to the output of the control circuit 207 which is also designed to deliver the activation signal for the first switch Qhs. The electrical circuit diagram of the additional ripple circuit is shown in FIG. 3. The error amplifier MEA allowing the setpoint signal Vcons to be generated has a first input connected to the reference voltage Vref and a second input connected to the first terminal 204 of the output port 206 of the converter. The comparator 210, allowing the first comparison to be carried out, has a first input connected to the output of the error amplifier MEA and a second input connected to the output of the additional ripple circuit Ond. Add. The output of the comparator 210, connected to the first input of the control circuit 207, supplies a binary signal representative of the result of the first comparison allowing the activation signal controlling the closing of the first switch to be generated when the decreasing signal representing the addition of the converted voltage level and of the ripple becomes equal to the setpoint signal Vcons. In one embodiment, the control circuit 207 is a programmable circuit such as an FPGA (for Field Programmable Port Array). This regulation allows a very fast control of the output voltage since it is based on a comparator used in an unconditionally stable control mode. This maximum speed of regulation allows a converter to be formed that has excellent dynamic performance characteristics. The static regulation performance is provided by the MEA which modifies the setpoint applied to the comparator in order to obtain a perfectly regulated average output voltage. The protection against overloads of the regulation circuit 211 comprises a comparator 212 having a first input for a predetermined current limitation signal Ilim and a second input connected to the circuit for measuring the current flowing in the second switch Qls. The first switch Qhs cannot be controlled for as long as the current I Qls is higher than Ilim, thus limiting the maximum output current of the converter. The maximum output current of the converter is, in practice, situated at a value Ipic (higher than Ilim) which depends on the constant Ton. FIG. 5 shows the timing diagrams of operation of the protection against overloads. Furthermore, the control circuit 207 is configured for opening the first switch Qhs for a predetermined minimum duration which allows the maximum frequency of operation of the converter to be limited during the transient phases.

Figure 6:
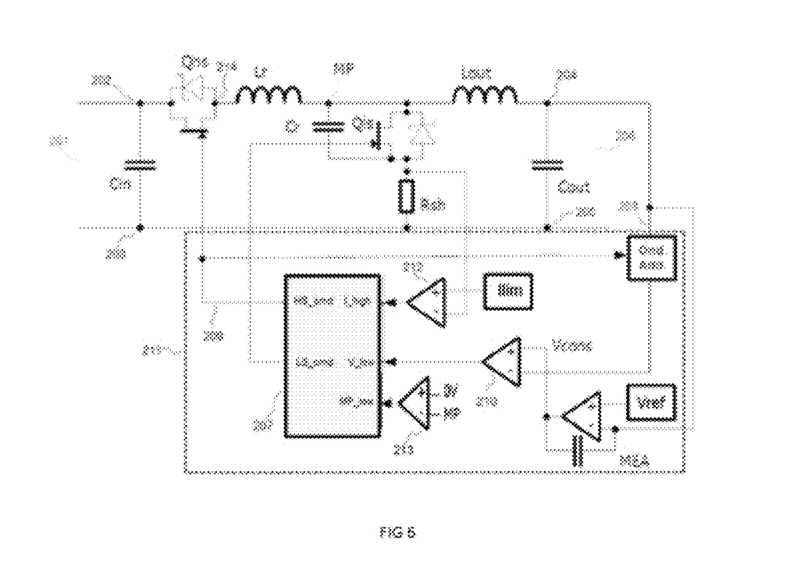
FIG. 6 illustrates an electrical circuit diagram of a quasi-resonant Buck converter according to a second embodiment of the invention.

FIG. 6 illustrates the electrical circuit diagram of a quasi-resonant Buck converter according to a second embodiment of the invention. The regulation circuit 211 comprises a voltage comparator circuit 213 configured for generating an activation signal LS_cmd for the second switch Qls when the voltage between the second terminal MP of the resonance inductor and the ground line becomes negative, and for generating a signal for opening the second switch Qls in correspondence with the generation of the activation signal HS_cmd controlling the closing of the first switch Qhs. The control circuit 207 thus comprises an additional input MP_low with respect to the embodiment illustrated by FIG. 2.

FIG. 3 shows the electrical circuit diagram of one particular embodiment of the additional ripple circuit represented by Ond.Add. in FIG. 2. The additional ripple circuit allows, on the one hand, a ripple voltage to be generated, rising or falling depending on the closed or open state of the first switch Qhs and, on the other hand, the ripple thus generated to be added to the converted voltage level. A voltage divider comprising the resistors Rs1 and Rs2 is connected between the output converted voltage Vout and ground. Rs2 has a first terminal representing its first input which is connected to the output voltage Vout and a second terminal connected to the first terminal of Rs1. The second terminal of Rs1 is connected to ground. The mid-point of the voltage divider represents the output of the additional ripple circuit which is connected to the first input of the comparator circuit. Two capacitors Ci1 and C2 are connected in series. The first terminal of the capacitor Ci1 is also connected to the converted voltage output Vout and its second terminal is connected, on the one hand, to the first terminal of the capacitor C2 and, on the other hand, to a first terminal of a resistor Ri1. The second terminal of Ri1 is connected to the output of the control circuit, whereas the second terminal of C2 is also connected to the mid-point of the voltage divider.

In another embodiment, the additional ripple circuit may be integrated into a dedicated circuit with the control circuit.

FIG. 4 shows timing diagrams illustrating the principle of the regulation of the converted voltage level Vout, this being substantially constant. In order to avoid the converted voltage level being too sensitive to interference noise, a minimum variation difference is needed between the maximum value and the minimum value of the converted voltage level. The signal Ond. represents the rising or falling ripple voltage, created by the additional ripple circuit, depending on the closed or open state of the first switch Qhs. The ripple is generated then added to the converted voltage level by the circuit shown in FIG. 3. The result of the addition of the ripple Ond. to the converted voltage level is represented by the signal Vout+Ond. The latter represents a voltage rising or falling depending on the closed or open state of the first switch Qhs which comprises a DC component equal to Vout. Before the time 401, the signal Vout+Ond decreases and becomes equal to the setpoint signal 404. This equality between the signal Vout+Ond and the setpoint signal 404 leads to the passage into the high state of the signal Vlow at the output of the comparator. The signal Vlow is transmitted on the first input of the control circuit to its internal control logic generating the activation signal HS_Cmd controlling the closing of the first switch. The activation signal HS_Cmd remains in the high state for the period Ton for which the signal Vout+Ond increases. At the time 402, HS_Cmd goes to the low state and the signal Vout+Ond, which is a maximum, begins to fall. The converted signal Vout+Ond decreases unitl the time 403 where it again becomes equal to the setpoint signal 404 which begins a new cycle for activation of the first switch.

FIG. 5 illustrates the timing diagrams showing the principle of the regulation of the protection against overloads according to the preferred embodiment in FIG. 2. The timing diagram of Vout shows the converted voltage level. Until the time 501, the function for protection against overloads is not effective. This is because the current I Qls remains less than the permitted limitation value Ilim. At the time 501, the current I Qls briefly reaches the value Ilim, which leads to a brief switch to the high state 502 of I_high. The exceeding of Ilim by I Qls at the time 501 is not sufficiently extensive in amplitude and in time to prohibit the conduction of HS_Cmd at the time 503. On the other hand, at the time 504, the exceeding by I Qls of the current Ilim is extensive in amplitude and in time. This leads to the passage into the high state of I_high at the time 505 and prohibits the passage to the high state of HS_Cmd. At the time 506, the converted voltage level Vout, not having received any transfer of charges due to the low state of HS_Cmd, decreases, which leads to the passage into the high state of V_low. At the time 507, the current I Qls has sufficiently decreased to allow the passage into the high state of HS_Cmd. The converted voltage level Vout still being too low, V_low remains in a high state. At the time 507, another command for passage into the high state of HS_Cmd is enabled. When the output overload decreases (before the time 509), the current decreases, the signal I_high falls back to zero and the output voltage Vout increases up to its reference level at the time 509, leading to the passage into the low state of V low corresponding to the end of the period of operation in an overload condition.

Furthermore, the control circuit 207 shown in FIG. 2 is configured for:

closing the second switch Qls when the voltage between the measurement point MP and the ground line becomes negative, this being an indication of the imminent conduction of the flywheel diode in parallel with Qls;

opening the second switch Qls when V low goes to the high state, this being an indication of the first switch Qhs possibly going into the closed state ("ON").

The current measurement circuit according to one embodiment comprises a Hall-effect sensor. In another embodiment, the GaN transistors are replaced by transistors developed with Ill-V materials and preferably with a wide bandgap. All of the functions of the regulation circuit may be implemented and integrated into a dedicated circuit such as an ASIC (for Application Specific Integrated Circuit). The converters of the prior art typically offer an efficiency of around 90%. At such levels of performance, the gains in efficiency require a significant effort. Nevertheless, the converter of the subject of the invention offers a considerable improvement in the performance characteristics with an efficiency of 95%.

The invention claimed is:

1. A DC voltage converter of the quasi-resonant Buck type comprising an input port having a first terminal designed to receive a voltage level to be converted, an output port having a first terminal designed to supply a converted voltage level, a ground line connecting a second terminal of the input port to a second terminal of the output port, a first switch connected in series to the first terminal of the input port and a regulation circuit having an input terminal connected to the first terminal of the output port of the converter and an output terminal connected to a control terminal of the first switch, characterized in that the regulation circuit is configured for:

generating a ripple voltage, rising or falling as a function of a closed or open state of the first switch;

generating a setpoint signal proportional to a difference between an average level of converted voltage and a reference voltage;

performing a first comparison between the setpoint signal and the converted voltage level to which the ripple voltage has been added; and depending on the result of the first comparison, generate an activation signal on an output of the regulation circuit controlling the closing of the first switch for a predefined period, wherein:

the regulation circuit further comprises:

a control circuit having an output capable of delivering the activation signal; and a comparator circuit having an output designed to deliver the result of the comparison, the output of the comparator being connected to a first input of the control circuit;

the regulation circuit further comprises:

an additional ripple circuit configured for delivering the converted voltage level to which the ripple voltage has been added, the additional ripple circuit having a first input connected to the first terminal of the output port of the converter, a second input connected to an output of the control circuit, and an output connected to a first input of the comparator circuit;

an error amplifier designed to deliver the setpoint signal, the amplifier having a first input connected to the first terminal of the output port of the converter, a second input configured for receiving the reference voltage, and an output connected to a second input of the comparator circuit;

the control circuit is further configured for controlling:

the closing or the opening of the first switch;

the generation, on the second input of the additional ripple circuit, of the rising or falling voltage, wherein the converter further comprises:

a resonance inductor connected in series with the first switch, having a first and a second terminal, the first terminal being connected to the first switch;

a resonance capacitor, having a first and a second terminal, the first terminal being connected to the second terminal of the resonance inductor;

a second switch connected between the first terminal of the resonance capacitor and the second terminal of the resonance capacitor, and wherein the regulation circuit comprises a voltage comparator circuit configured for generating an activation signal for the second switch when the voltage between the second terminal of the resonance inductor and the ground line becomes negative, and for generating a signal for opening the second switch in correspondence with the generation of the activation signal controlling the closing of the first switch.

2. The voltage converter according to claim 1, wherein the first switch and the second switch exhibit a switching time less than or equal to 10 ns.

3. The voltage converter according to claim 1, also comprising a low-pass output filter.

4. A DC voltage converter of the quasi-resonant Buck type comprising an input port having a first terminal designed to receive a voltage level to be converted, an output port having a first terminal designed to supply a converted voltage level, a ground line connecting a second terminal of the input port to a second terminal of the output port, a first switch connected in series to the first terminal of the input port and a regulation circuit having an input terminal connected to the first terminal of the output port of the converter and an output terminal connected to a control terminal of the first switch, characterized in that the regulation circuit is configured for:

generating a ripple voltage, rising or falling as a function of a closed or open state of the first switch;

generating a setpoint signal proportional to a difference between an average level of converted voltage and a reference voltage;

performing a first comparison between the setpoint signal and the converted voltage level to which the ripple voltage has been added; and depending on the result of the first comparison, generate an activation signal on an output of the regulation circuit controlling the closing of the first switch for a predefined period, wherein:

the regulation circuit further comprises:

a control circuit having an output capable of delivering the activation signal; and a comparator circuit having an output designed to deliver the result of the comparison, the output of the comparator being connected to a first input of the control circuit;

the regulation circuit further comprises:

an additional ripple circuit configured for delivering the converted voltage level to which the ripple voltage has been added, the additional ripple circuit having a first input connected to the first terminal of the output port of the converter, a second input connected to an output of the control circuit, and an output connected to a first input of the comparator circuit;

an error amplifier designed to deliver the setpoint signal, the amplifier having a first input connected to the first terminal of the output port of the converter, a second input configured for receiving the reference voltage, and an output connected to a second input of the comparator circuit;

the control circuit is further configured for controlling:
the closing or the opening of the first switch;
the generation, on the second input of the additional ripple circuit, of the rising or falling voltage, wherein the converter further comprises:
a resonance inductor connected in series with the first switch, having a first and a second terminal, the first terminal being connected to the first switch;

a resonance capacitor, having a first and a second terminal, the first terminal being connected to the second terminal of the resonance inductor;

a second switch connected between the first terminal of the resonance capacitor and the second terminal of the resonance capacitor, wherein the regulation circuit comprises a circuit for protection against overloads comprising a circuit for measuring a current flowing in the second switch; and a comparator circuit having:
a first input for a predetermined limitation current signal;
a second input connected to the circuit for measuring the current flowing in the second switch;
the circuit for protection against overloads having further an output connected to a second input of the control circuit; the control circuit being configured for delivering, on its output, a signal depending on a comparison between the first input and the second input and controlling the opening of the said first switch for as long as the said signal representative of the current flowing in the second switch is equal to at least the predetermined limitation current signal.

5. The voltage converter according to claim 4, wherein the said current measurement circuit comprises a resistor connected between the second terminal of the resonance capacitor and the ground line.

6. The voltage converter according to claim 1, comprising a flywheel diode connected in parallel with the first switch, having a cathode connected to the first terminal of the first port, wherein the predefined period is chosen for opening the first switch when the current flowing through the first switch flows in the flywheel diode.

7. The voltage converter according to claim 1, wherein the control circuit is configured for opening the first switch for a predetermined minimum duration in order to limit the maximum frequency of operation.

8. The voltage converter according to claim 1, wherein the first switch and the second switch exhibit a switching time less than or equal to 100 ns.

9. The voltage converter according to claim 8, wherein the first switch and the second switch are fabricated using GaN technology.

10. The voltage converter according to claim 1, wherein the first switch and the second switch comprise a flywheel diode.

11. A method for conversion of a voltage by means of a DC voltage converter of the quasi-resonant Buck type, the voltage converter comprising an input port having a first terminal intended to receive a voltage level to be converted, an output port having a first terminal designed to supply a converted voltage level, a ground line connecting a second terminal of the input port to a second terminal of the output port, a first switch connected in series to the first terminal of the input port and a regulation circuit having an input terminal connected to the first terminal of the output port of the converter and an output terminal connected to a control terminal of the first switch, the method comprising the steps for:

generation of a ripple voltage, rising or falling depending on a closed or open state of the first switch;

generation of a setpoint signal proportional to a difference between an average level of converted voltage and a reference voltage;

comparison between the setpoint signal and the converted voltage level to which the ripple voltage has been added; and, depending on the result of the first comparison:

generation of an activation signal controlling the closing of the first switch for a predefined period, wherein the DC voltage converter of the quasi-resonant Buck type also comprises a resonance inductor connected in series with the first switch, having a first and a second terminal, the first terminal being connected to the first switch; a resonance capacitor, having a first and a second terminal, the first terminal being connected to the second terminal of the resonance inductor; a second switch connected to the first terminal of the resonance capacitor and to the second terminal of the resonance capacitor; the method further comprising steps for:

generation of a signal for closing the second switch when the voltage between the second terminal of the resonance inductor and the ground line becomes negative; and generation of a signal for opening the second switch in correspondence with the generation of the activation signal controlling the closing of the first switch.

* * * * *